United States Patent [19]

Seitz et al.

[11] Patent Number: 5,555,473
[45] Date of Patent: Sep. 10, 1996

[54] ENGRAVING SYSTEM AND METHOD FOR HELICAL OR CIRCUMFERENTIAL ENGRAVING

[75] Inventors: David R. Seitz, Vandalia; Curtis Woods, Centerville; Matthew A. Thomas, Beavercreek, all of Ohio

[73] Assignee: Ohio Electronic Engravers, Inc., Dayton, Ohio

[21] Appl. No.: 391,582

[22] Filed: Feb. 21, 1995

[51] Int. Cl.[6] .................................................. B41C 1/04
[52] U.S. Cl. .................................................. 358/299
[58] Field of Search .......................................... 358/299

[56] References Cited

U.S. PATENT DOCUMENTS

| | | | |
|---|---|---|---|
| 2,881,246 | 4/1959 | Fairchild | 178/6.6 |
| 3,280,252 | 10/1966 | Lilien et al. | 178/6 |
| 3,636,251 | 1/1972 | Daly et al. | 178/6.6 B |
| 3,652,992 | 3/1972 | Koll | 340/146.3 B |
| 3,694,570 | 9/1972 | Kotov et al. | 178/6.6 B |
| 3,770,888 | 11/1973 | de Vos et al. | 178/6.6 B |
| 3,784,739 | 1/1974 | de Vos et al. | 178/6.6 B |
| 3,819,854 | 6/1974 | Kolb | 178/6.7 R |
| 3,876,829 | 4/1975 | Schreiber | 178/7.3 D |
| 3,904,816 | 9/1975 | Taudt et al. | 178/6 |
| 3,956,583 | 5/1976 | Pugsley | 178/6.6 R |
| 3,964,382 | 6/1976 | Baar et al. | 101/1 |
| 4,003,311 | 1/1977 | Bardin | 101/426 |
| 4,007,362 | 2/1977 | Sindermann | 235/151 |
| 4,013,829 | 3/1977 | Baar et al. | 358/299 |
| 4,013,831 | 3/1977 | Dolves et al. | 358/299 |
| 4,052,739 | 10/1977 | Wada et al. | 358/299 |
| 4,079,235 | 3/1978 | Froyd et al. | 364/107 |
| 4,126,821 | 11/1978 | Cannon | 318/696 |
| 4,174,527 | 11/1979 | Schaefer | 358/267 |
| 4,287,537 | 9/1981 | Pfau et al. | 358/299 |
| 4,342,052 | 7/1982 | Rackley et al. | 358/287 |
| 4,347,785 | 9/1982 | Chase et al. | 101/1 |
| 4,357,633 | 11/1982 | Buechler | 358/299 |
| 4,394,693 | 7/1983 | Shirley | 358/298 |
| 4,450,486 | 5/1984 | Buechler | 358/299 |
| 4,451,856 | 5/1984 | Buechler | 358/299 |
| 4,484,232 | 11/1984 | Gast | 358/299 |
| 4,500,929 | 2/1985 | Buechler | 358/299 |
| 4,503,468 | 3/1985 | Serinken et al. | 358/256 |
| 4,603,391 | 7/1986 | Inoue et al. | 364/474 |
| 4,612,584 | 9/1986 | George et al. | 358/299 |
| 4,678,976 | 7/1987 | Inoue | 318/577 |
| 4,683,500 | 7/1987 | Kitamura et al. | 358/280 |
| 4,688,101 | 8/1987 | Doelves et al. | 358/299 |
| 4,830,552 | 5/1989 | Ryf | 409/103 |
| 5,229,861 | 7/1993 | Nozaka et al. | 358/299 |
| 5,293,426 | 3/1994 | Wouch et al. | 382/1 |
| 5,327,165 | 7/1994 | Pollard et al. | 358/299 X |
| 5,329,215 | 7/1994 | Fraser et al. | 318/603 |
| 5,440,398 | 8/1995 | Holowko et al. | 358/299 |
| 5,491,559 | 2/1996 | Buechler | 358/299 |

FOREIGN PATENT DOCUMENTS 0473973  3/1992  European Pat. Off. .

OTHER PUBLICATIONS

"Datwyler," MDC Max Daetwyler Corp., USA, 13420 W. Reese Blvd., Huntersville, NC 28078, undated brochure.

(List continued on next page.)

Primary Examiner—Peter S. Wong
Assistant Examiner—Eric Frahm
Attorney, Agent, or Firm—Jacox, Meckstroth & Jenkins

[57] ABSTRACT

A cylindrical engraving system selectively able to engrave either in a helical or circumferential format. An encoder scans index markings on the surface of a cylinder being engraved and generates timing pulses for selective application to one or the other of a helical drive unit or a circumferential drive unit incorporated within the system controller. Engraving is performed by an engraving head which is stepped in the axial direction along the workpiece in response to step pulses generated by the selected drive unit. The step pulses may be generated in spaced bursts or at a regular frequency depending upon whether circumferential or helical driving has been selected.

47 Claims, 4 Drawing Sheets

OTHER PUBLICATIONS

"Polishmaster Junior High–Precision Machining and Measuring Center for Rotogravure Cylinders," MDC Max Datwyler AG, CH–3358 Bleienbach/Schweiz, Switzerland, undated brochure.

"Polishmaster High–Precision Machining and Measuring Centre for Gravure Cylinders," MDC Max Datwyler AG, CH–3368 Bleienbach/Schweiz, Switzerland, undated brochure.

"Finishmaster Unit for Polishing of Rotogravure Cylinders After Copper or Chrome Plating," MDC Max Datwyler AG, CH–3368 Bleienbach/Schweiz, Switzerland, undated brochure.

"Cu–Master Type E Plating Tanks for Copper–Plating of Rotogravure Cylinders," MDC Max Datwyler AG, CH–3368 Bleienbach/Schweiz, Switzerland, undated brochure.

"Cr–Master Type E Plating Tanks for the Chrome–Plating of Rotogravure Cylinders," MDC Max Datwhler AG, CH–3368 Bleienbach/Schweiz, Switzerland, undated brochure.

"Twin–Pilot," Maschinenfabrik Kaspar Walter GmbH & Co., KG, Plinganserstrasse 22, 8000 Munchen 70, Germany, undated brochure.

JAV, "Getting Better Accuracy with Non–Precision Ball Screws," American Machinist, Feb. 1993, pp. 50–51.

"HelioKlischograph K304–for Packaging and Product Gravure Printing," Hell Graphic Systems, Inc. Dr. Ing. Rudolf Hell GmbH, P.O. Box 6229, D–2300 Kiel 14, undated brochure.

"Helio–Klischograph—Precision Engraving in Copper," Hell Graphic Systems, Inc., Dr. Ing. Rudolf Hell GmbH, P.O. Box 6229, D–2300 Kiel 14, undated brochure.

"Helio Klischograph K301 and K302 for Magazine Gravure Printing," Hell Graphic Systems, Inc., Dr. Ing. Rudolf Hell GmbH, P.O. Box 6229, D–2300 Kiel 14, undated brochure.

The Gravure Association of America, *The Gravure Engraving Manual* 1987.

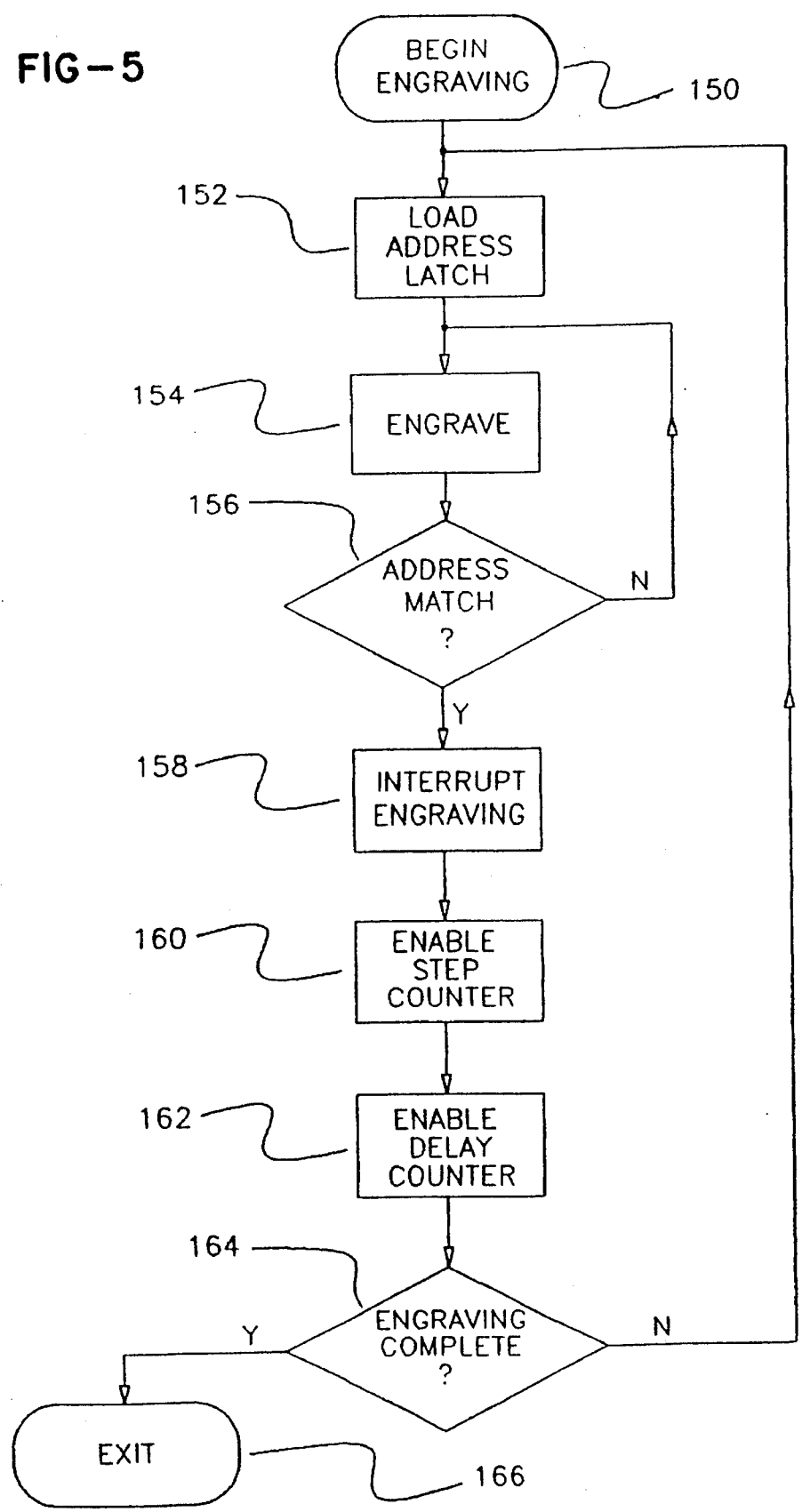

5,555,473

ENGRAVING SYSTEM AND METHOD FOR HELICAL OR CIRCUMFERENTIAL ENGRAVING

BACKGROUND OF THE INVENTION

This invention relates to the field of high resolution engraving, and more particularly, to an engraving system and method which is capable of performing both cylindrical and helical engraving. The invention also has application to engraving systems using a high energy laser.

In such engraving an engraving stylus may be mounted on a carriage which is carried by a leadscrew along a path in engraving contact with the surface of a rotating cylinder such as a gravure printing cylinder. The leadscrew may be driven by a motor assembly which responds to electronic pulses and which rotates through a defined angular increment for each applied pulse. Either a stepping motor or a servomotor may be employed, and engraving may be performed. Circumferential systems rotate the leadscrew in stepped angular increments and do their engraving between steps, while the leadscrew is stopped. Helical systems drive the leadscrew more or less continuously without interrupting the engraving. Circumferential systems have the advantage of good vertical line reproduction and are less susceptible to patterns in engraving, due to no carriage movement during engraving, whereas helical systems are faster.

Data for controlling the engraving depth may be stored on a disk, tape or other storage medium and must be formatted to accommodate the particular engraving path which will be used. Once the data file has been prepared, the type of engraving path is dictated. If the data file has been prepared for circumferential engraving, it may not be used by a helical engraver, and vice versa. This has complicated production problems for large production facilities having both types of engravers. It has also limited smaller production facilities in their ability to accept data files originating at diverse locations. It is therefore seen that there has been a need for a versatile engraver able to accept data files prepared in either a circumferential or a helical format.

SUMMARY OF THE INVENTION

In accordance with the present invention a cylindrical engraver is configured for performing engraving in either a circumferential or a helical format. The system has a controller comprising a circumferential drive unit and a helical drive unit which generate stepping pulses for selective application to a stepping motor. The circumferential drive unit generates the stepping pulses in spaced bursts, whereas the helical drive unit generates them at a regular frequency according to a desired horizontal screen factor. The circumferential drive unit also generates an engraving PAUSE signal for interrupting activity by the engraving tool while the stepping pulses are causing the tool to be axially advanced. Furthermore, the circumferential drive unit generates a buffer control signal for advancing a column count following stepped axial movement by the engraving tool.

It is therefore an object of this invention to provide a cylindrical engraving system able to perform either circumferential or helical engraving upon demand.

Other objects and advantages of the invention will be apparent from the following description, the accompanying drawings and the appended claims.

BRIEF DESCRIPTION OF THE DRAWING

FIG. 5 is a flow chart for circumferential engraving by the engraving system of this invention.

DESCRIPTION OF THE PREFERRED EMBODIMENT

Figure 1:
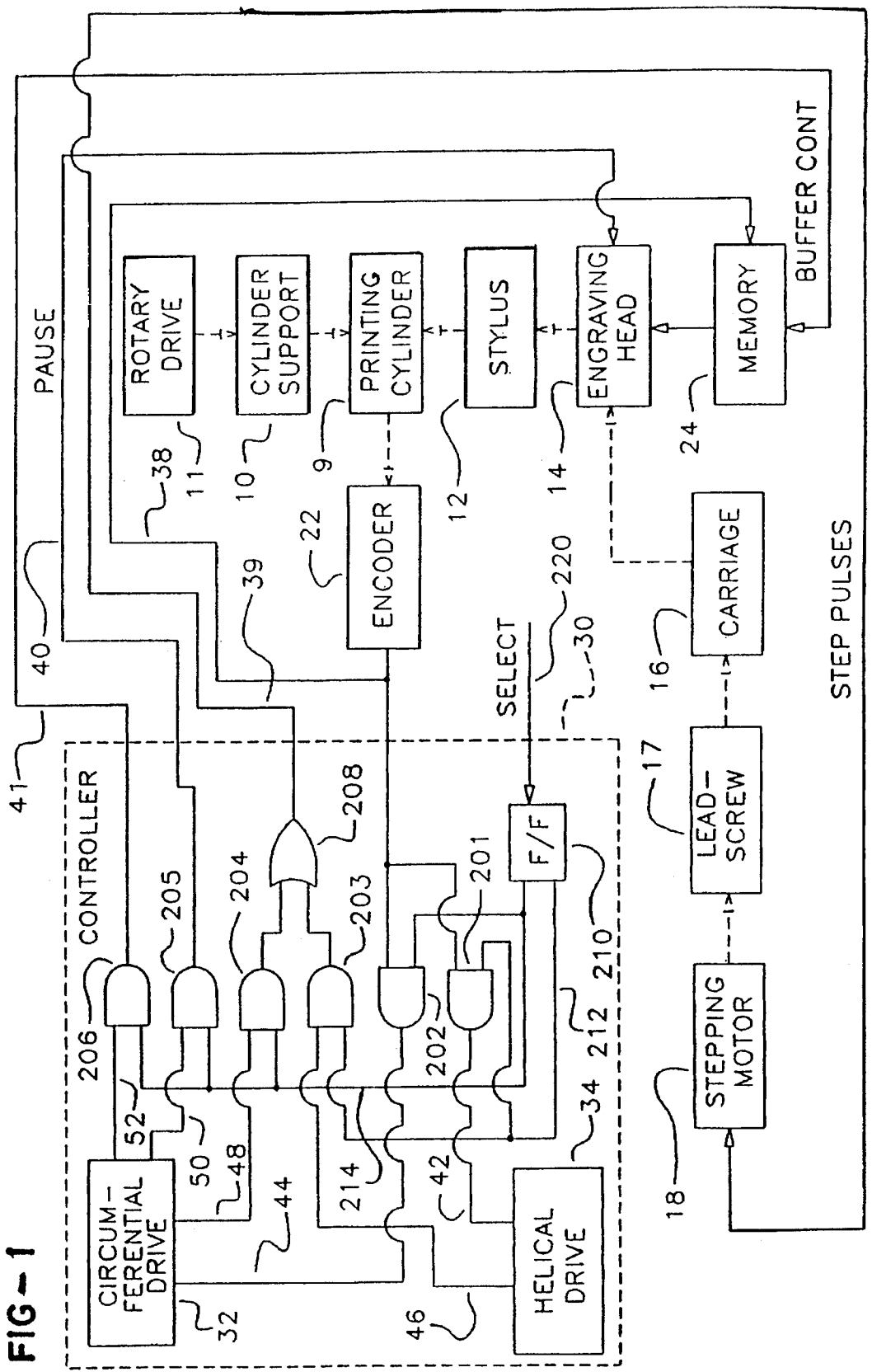
FIG. 1 is a generalized block diagram of a cylindrical engraver able to perform either circumferential or helical engraving.

An engraving system in accordance with the present invention may be configured as generally illustrated in block diagram form in FIG. 1. Thus a printing cylinder 9 may be mounted on a cylinder support 10 driven by a rotary drive 11 for engraving by a stylus 12 in the customary manner. Engraving stylus 12 is mounted on an engraving head 14 supported by a carriage 16. Carriage 16 is carried in the axial direction (i.e. horizontal direction parallel to the cylindrical axis of printing cylinder 9) by a lead screw 17. It should be appreciated that while this embodiment is shown in use with a stylus, it could be used with types of engraving, such as laser engraving.

Lead screw 17 has a helical thread (not illustrated) which engages carriage 16. Lead screw 17 is rotated in stepped angular increments by a stepping motor 18. The rotation of lead screw 17 causes stylus 12 to advance in the axial direction along the surface of printing cylinder 9. Engraving head 14 operates under control of engraving commands stored in memory 24 to move stylus 12 in and out of engraving contact with printing cylinder 9. A controller 30 generates signals on lines 39,40,41 which cause stylus 12 to engrave cavities in the surface of the printing cylinder in either a helical or a circumferential format, as desired. Controller 30 maintains two-dimensional registration of the engraved cavities through use of rotational position pulses in the form of quarter-cell clock signals generated by an encoder 22 and applied to a line 38. The same quarter-cell clock pulses are applied to memory 24, for gating out engraving commands and thereby controlling the operation of engraving head 14. Encoder 22 generates these pulses by scanning a series of index marks on the surface of printing cylinder 9.

During helical engraving, controller 30 causes stepping motor 18 to rotate lead screw 17 in regularly occurring angular steps. This produces a more or less constant speed axial advance of engraving head 14. Engraving proceeds without interruption.

For circumferential engraving controller 30 causes stepping motor 18 to rotate lead screw 17 in spaced bursts of rapidly repeated angular steps. Each burst causes carriage 16, engraving head 14 and stylus 12 to step forward in the axial direction a distance equal to one-half the width of one column of engraved cells. No engraving is performed during this axial movement.

Controller 30 controls the engraving operation by selectively switching either a circumferential drive unit 32 or a helical drive unit 34 into communication with the engraving hardware. The nature of the switching mechanism will vary with the specific implementation selected for practicing the invention. Generally speaking, the required switching may be accomplished either in hardware or software. For simplicity and ease of illustration, FIG. 1 shows a hardware implementation employing six AND gates 201–206, an OR gate 208 and a drive select unit 210.

Drive select unit 210 may be a simple FLIP-FLOP having a helical selection output line 212 and a circumferential output line 214, which are selectively switched HI in response to the state of an input line 220. Output line 212 enables AND gate 201 to pass encoder signals from line 38 to helical drive unit 34 via line 42. Line 212 also enables AND gate 203 to pass stepping pulses from helical drive unit 34 to line 39 via line 46 and OR gate 208.

Output line 214 from FLIP-FLOP 210 enables AND gates 202, 204, 205, 206. AND gate 202 passes encoder pulses to circumferential drive unit 32 via line 44, while AND gate 204 passes stepping pulses from unit 32 to line 39 via line 48 and OR gate 208. AND gates 205, 206 pass a PAUSE signal from line 50 and a buffer control signal from line 52 to lines 40, 41 respectively.

The stepping pulses will appear on line 39 either at a regular frequency or in spaced, high frequency bursts, as appropriate for helical or circumferential engraving, respectively. In a typical system each step will produce a lead screw rotation of about 0.043 deg and an axial advance of about 0.748 micron. For equal graphic resolutions, the same total number of steps will occur for a single rotation of either helical or circumferential engraving. Only the timing will differ.

Figure 2:
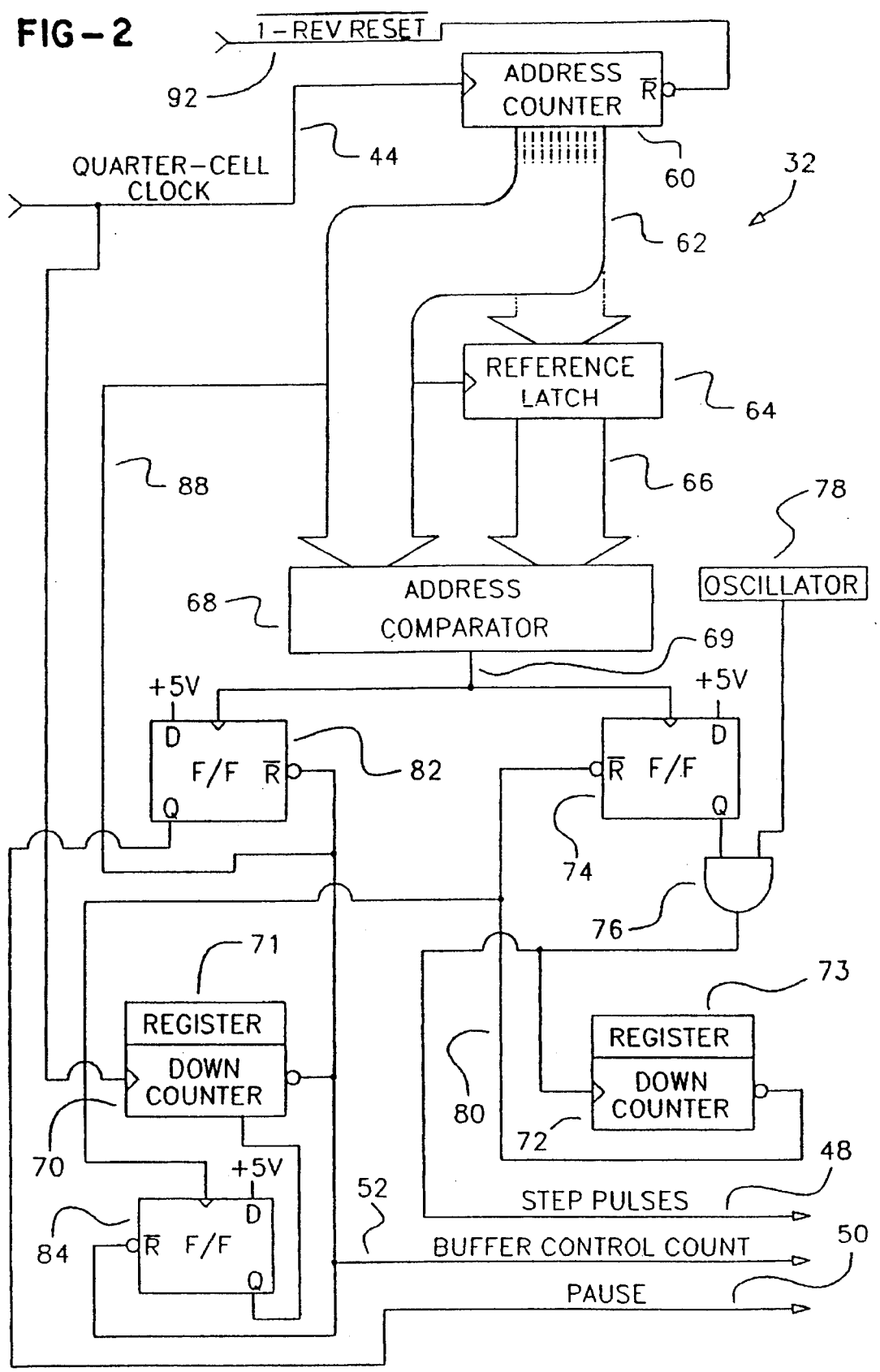
FIG. 2 is a block diagram of a circumferential drive unit.
Figure 3:
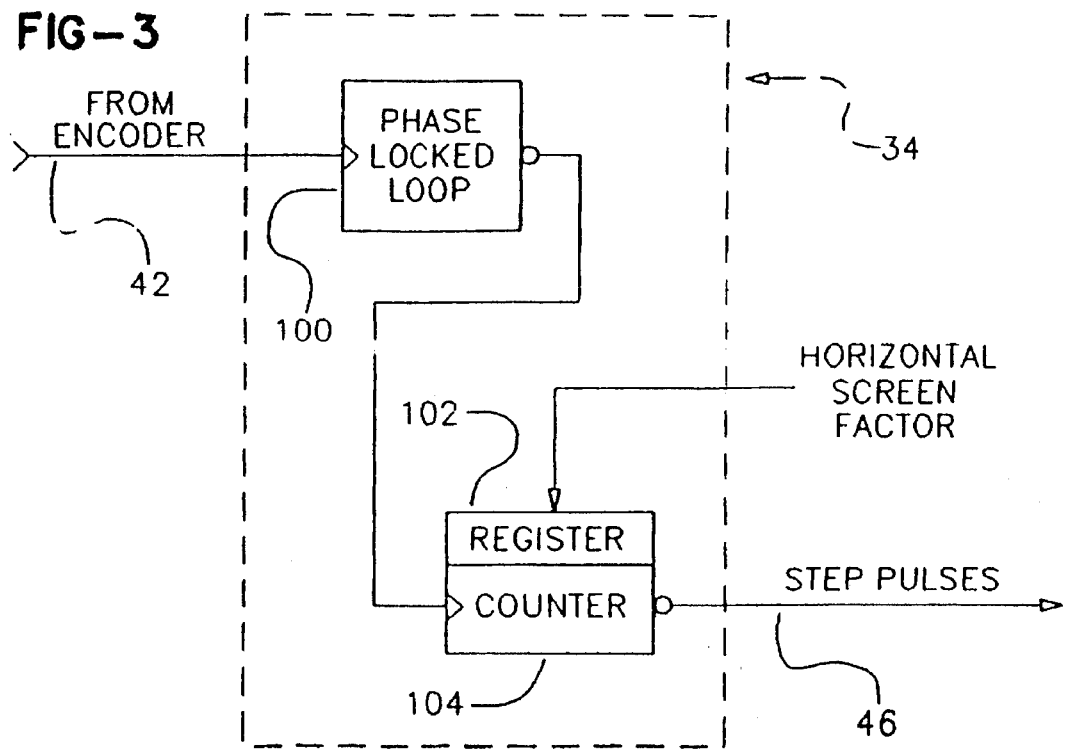
FIG. 3 is a block diagram of a helical drive unit.

The PAUSE signal is applied to engraving head 14 when the system is in the circumferential mode to prevent engraving while stepping pulses on line 39 are advancing the engraving head 14. The buffer control signals on line 41 are applied to memory 24 for column addressing, as discussed below. Additional details of circumferential drive 32 and helical drive 34 are shown in FIGS. 2, 3 respectively.

As stated above, the engraving motion of stylus 12 is paused while carriage 16 is advancing in the circumferential engraving mode. It will be appreciated that carriage advancement is followed by a period of mechanical oscillation. This oscillation would have an adverse effect upon the engraving, and therefore the pause continues until the oscillation has stopped. Consequently a circumferential engraver of the diamond stylus type requires approximately 20 percent more time than its counterpart helical engraver for engraving a vertical (i.e., circumferential direction) column of cells.

The pause also complicates the data handling, because the rotation of the printing cylinder continues while the pause is in effect. Since registration must be maintained throughout the engraved area, memory 24 must ignore the pause and continue addressing its storage locations as though no interruption had occurred. This assures that stylus 12 will be driven with the correct signal for the current rotational position of the printing cylinder, when engraving head 14 resumes oscillating.

Even though readout continues, no engraving occurs during the pause, and a series of cells are missed. These missing cells are engraved after the current column is completed, and carriage 16 waits for this to be done before making a further column-to-column advance.

Engraving control data is stored within random access storage in memory 24. This storage is accessed through a 32-bit address; the most significant 16 bits being a column count, and the least significant 16 bits being a line count. Circumferential drive 32 keeps track of the lost "pause" time and provides memory 24 with column pulses at the correct intervals. These pulses are applied to line 52 and transferred to memory 24, as described above. Memory 24 counts these pulses to generate a column address. Memory 24 generates the correct line address by counting quarter-cell clock pulses supplied by encoder 22 on line 38. Encoder 22 also supplies inverted 1-REV pulses to memory 24 for resetting the line count. These pulses may be multiplexed onto line 38 or applied to another line (not illustrated in FIG. 1), parallel to line 38.

Referring now to FIG. 2, it will be seen that circumferential drive 32 has a line address counter 60 which duplicates the line counting task performed by memory 24. For this purpose line address counter 60 receives quarter-cell clock pulses and inverted 1-Rev reset pulses from encoder 22 on lines 44,92 respectively.

As counter 60 counts quarter-cell pulses, it generates corresponding line addresses on a series of 16 address lines 62. The line address at any point in time corresponds to the current actual position of printing cylinder 9, and each new address is applied to a reference latch 64 and to an address comparator 68. Reference latch 64 also receives a sample of the buffer control signal on line 82. This signal causes memory 24 to generate new column addresses, as described above. It also causes reference latch 64 to read and latch a line address for the then current position of printing cylinder 9.

Address comparator 68 reads each new line address generated by address counter 60 on address lines 62 and compares it with latched address received on a set of latch lines 66 from reference latch 64. Whenever the current line address is the same as the latched line address, address comparator 64 knows that a complete column of cells has been engraved and that it is time to initiate a carriage advance. At this time address comparator 68 generates a column completion signal on line 69 for application to a first flip-flop 82 and a second flip-flop 74. The column completion signal sets first flip-flop 82, thereby generating the above-described PAUSE signal on line 50 to interrupt the operation of engraving head 14.

When the column completion signal is applied to second flip-flop 74, that flip-flop is also set and produces an output signal which enables AND gate 76 to pass step pulses from an oscillator 78 to line 48. Oscillator 78 is a free running device which operates at an appropriate frequency for generating the bursts of step pulses required for circumferential engraving. It will be appreciated that this frequency may be varied to accommodate mechanical reluctance of carriage and different carriage configurations or configurations having multiple engraving heads. A typical operating frequency for oscillator 78 may be in the order of about 10 kilohertz.

Step pulses from AND gate 76 are also applied to a first counter 72 which is controlled by a register 73. Register 73 initializes counter 72 with a count equal to number of step pulses required for a burst. When counter 72 has counted down to zero, it produces an output signal on line 80. The signal on line 80 resets second flip-flop 74, thereby disabling AND gate 76. This terminates generation of step pulses on line 48. It will be appreciated that register 73 receives a copy of the signal on line 80 and responds by initializing down counter 72 for counting the next burst of step pulses.

The count completion signal from down counter 72 also sets a third flip-flop 84 which in turn puts a logic signal of appropriate state onto a line 86 for enabling a down count by a second down counter 70. Counting by down counter 70 continues for a sufficient period of "time" to enable the dampening of mechanical oscillations associated with the carriage advance. In actuality the delay is a spatial, rather than a time, delay, because counter 70 counts quarter-cell clock pulses received by circumferential drive 32 on input line 44 from encoder 22. Down counter 70 is initialized with an appropriate count by register 71. When down counter 70 counts out, it generates the previously mentioned buffer control signal on line 52. This signal is also applied to line 88 for causing reference latch 64 to latch a new line address.

Helical drive 34 is substantially less complex that circumferential drive 32. Referring now to FIG. 3, it will be seen that helical drive 34 comprises a phase locked loop 100 and a counter 104 which is initialized by a register 102. Encoder position clock pulses from encoder 22 are applied to phase locked loop 100 by input line 42. Phase locked loop 100 is of conventional design and merely generates a high resolution phase locked sequence of pulses having a frequency equal to 480 times the average frequency of the encoder pulses. Counter 104 is initialized with a count which depends upon the desired horizontal screen factor. Counter 104 generates a step pulse on line 46 for each N encoder pulses, where N is the horizontal screen factor set into register 102.

Figure 4:
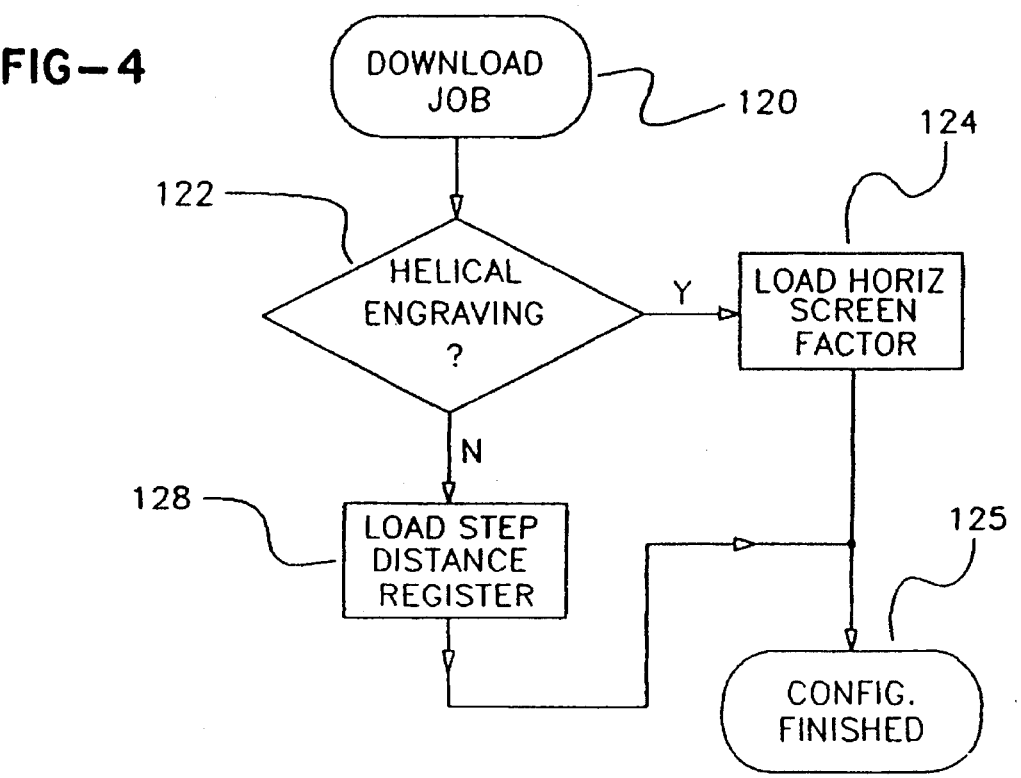
FIG. 4 is a flow chart of the process for configuring a cylindrical engraver to perform engraving according to a selected format.

FIG. 4 presents a flow chart summarizing the steps required for configuring the engraving system to perform either circumferential or helical engraving. The process begins at point 120 where the job is downloaded from storage. The next step (as illustrated at point 120) is to check a job code supplied with the job to determine whether engraving is to be performed helically. If so, then the appropriate horizontal screen factor is loaded into register 102 (block 124). If a helical job has not been indicated, then circumferential engraving is selected, and an appropriate burst count is loaded into step distance register 73 (block 128).

FIG. 5 presents a flow chart summarizing the circumferential engraving process, as already described above with reference to FIG. 2. Briefly, the process begins at point 150 and proceeds by first loading a reference address into latch 64 (block 152). Engraving is performed at block 154 and continues without interruption, until address comparator 68 sees a current address matching the latched reference address (point 156).

When an address match has been recognized, engraving is interrupted by generating the PAUSE signal on line 50 (block 158), and down counter 72 is enabled for counting step pulses generated by oscillator 78 (block 160). Then down counter 70 is enabled for performing a "delay" count (block 162). Meanwhile the column address count (in memory 24) is checked in order to determine whether the engraving job has been completed (point 164). If not, then the system waits for counter 70 to count out, and returns to block 152 where a new reference line address is loaded into latch 64. The system exits at point 164 when engraving has been completed.

Advantageously, the method and system of the present invention provides means for engraving either a helical pattern or a cylindrical pattern as desired. It should be appreciated that ? hold patterns could be engraved on the same cylinder, if desired, thereby providing means for engraving both a helical and cylindrical pattern on the same cylinder using the same engraver.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An engraver for helically or cylindrically engraving a cylinder, comprising:

an engraving head;

a driver coupled to said engraving head for driving said engraving head across a surface of said cylinder; and a controller coupled to said engraving head and said driver for energizing said engraving head and said driver to selectively engrave either a helical pattern or a cylindrical pattern on said surface.

2. The engraver of claim 1 wherein said controller comprises:

a circumferential drive unit; and a helical drive unit;

said controller being capable of selectively switching between said circumferential drive unit and said helical drive unit.

3. The engraver of claim 1 wherein said controller further comprises:

a circumferential driver for generating a circumferential drive signal;

a helical driver for generating a helical drive signal; and a switch for selectively switching between said circumferential drive unit and said helical drive unit.

4. The engraver of claim 3 wherein said switch comprises at least one flip-flop.

5. The engraver as recited in claim 1 wherein said controller comprises:

a signal generator for selectively generating either a helical drive signal or cylindrical drive signal for energizing said driver and said engraving head to engrave either said helical pattern or said cylindrical pattern.

6. The engraver as recited in claim 3 wherein said switch comprises at least one AND gate and at least one OR gate arranged to permit said controller to selectively switch between said circumferential driver and said helical driver.

7. The engraver as recited in claim 1 wherein said controller further comprises a pause generator coupled to said engraving head for generating an engraving pause signal when said cylindrical pattern is being engraved.

8. A cylindri-helic signal generator for use in an engraver, said cylindri-helic signal generator comprising:

a circumferential drive for generating a circumferential drive signal;

a helical drive for generating a helical drive signal; and a switch for selectively switching between said circumferential drive and said helical drive when it is desired to engrave either a circumferential pattern or a helical pattern, respectively.

9. The cylindri-helic signal generator of claim 8 wherein said switch comprises at least one flip-flop.

10. The cylindri-helic signal generator as recited in claim 8 wherein said switch comprises at least one AND gate and at least one OR gate arranged to permit said controller to selectively switch between said circumferential drive and said helical drive.

11. The cylindri-helic signal generator as recited in claim 8 wherein said controller further comprises a pause generator coupled to said engraving head for generating an engraving pause signal when said cylindrical pattern is being engraved.

12. A method for engraving either a cylindrical pattern or a helical pattern, said method comprising the steps of:

determining whether to engrave a helical pattern or a cylindrical pattern;

generating a helical engrave signal if said helical pattern is determined or a cylindrical engrave signal if said cylindrical pattern is determined; and engraving either said helical pattern or said cylindrical pattern in response to said helical engrave signal or said cylindrical engrave signal, respectively.

13. The method as recited in claim 12 wherein said method further comprises the steps of:

determining a distance if said cylindrical pattern is determined in said determining step;

moving an engraving head said distance before engraving.

14. The method as recited in claim 12 wherein said method further comprises the step of:

engraving a first column of cells on a cylinder with an engraving head;

moving said engraving head a distance;

engraving a second column of cells adjacent said first column of cells.

15. The method as recited in claim 12 wherein said method further comprises the step of:

interrupting said engraving if said cylindrical patter is being engraved.

16. The method as recited in claim 12 wherein said method further comprises the step of:

continuously engraving said helical pattern on said cylinder.

17. The method as recited in claim 12 wherein said engraving step comprises the step of:

driving said engraving head to a first position on said engraving head to a first position on said surface of a cylinder;

energizing said engraving head to engrave a column of cells on said surface of said cylinder in response to said cylindrical engrave signal;

pausing engraving while driving said engraving head to a second position;

energizing said engraving head while at said second position to engrave a second column of cells on said surface of said cylinder in response to said cylinder engrave signal.

18. The method as recited in claim 12 wherein said method further comprises the step of:

switching engraving from said helical pattern or said cylindrical pattern to said cylindrical pattern or said helical pattern, respectively.

19. A method for engraving either a helical pattern or a cylindrical pattern on a cylinder, said method comprising the steps of:

selecting either said helical pattern or said cylindrical pattern;

generating an energizing signal corresponding to whichever of said helical pattern or said cylindrical pattern was selected; and engraving said cylinder in response to said energizing signal.

20. The method as recited in claim 19 wherein said energizing step comprises the step of:

driving said engraving head substantially continuously if said helical pattern was selected during said selecting step.

21. The method as recited in claim 19 wherein said method further comprises the step of:

intermittently driving said engraving head if said cylindrical pattern was selected during said selecting step.

22. The method as recited in claim 21 wherein said cylindrical pattern has a corresponding set of cylindrical data, said method further comprising the step of:

processing said set of cylindrical data when said engraving head is being driven in order to maintain registration of said cylindrical pattern.

23. The method as recited in claim 19 wherein said method further comprises the steps of:

determining a horizontal screen factor if a helical pattern is selected during said selecting step;

using said horizontal screen factor during said generating step.

24. The method as recited in claim 19 wherein said method further comprises the step of:

engraving either said helical pattern or said cylindrical pattern using the same engraver.

25. The method as recited in claim 19 wherein said method further comprises the step of:

switching between said helical pattern and said cylindrical pattern while the cylinder is being engraved.

26. The method as recited in claim 19 wherein said method is effected using a gravure engraver.

27. A method of using a single engraver to engrave either a helical pattern or a cylindrical pattern on a cylinder, said method comprising the steps of:

providing a helical drive for generating a helical signal corresponding to said helical pattern and a cylindrical drive for generating a cylindrical signal corresponding to said cylindrical pattern;

selecting either said helical pattern or said cylindrical pattern; and engraving said cylinder using either said helical signal if said helical pattern was selected or said cylindrical signal if said cylindrical pattern was selected.

28. The method as recited in claim 27 wherein said energizing step comprises the step of:

driving an engraving head substantially continuously if said helical pattern was selected during said selecting step.

29. The method as recited in claim 27 wherein said method further comprises the step of:

intermittently driving an engraving head if said cylindrical pattern was selected during said selecting step.

30. The method as recited in claim 29 wherein said cylindrical pattern has a corresponding set of cylindrical data, said method further comprising the step of:

processing said set of cylindrical data when said engraving head is being driven in order to maintain registration of said cylindrical pattern.

31. The method as recited in claim 27 wherein said method further comprises the steps of:

determining a horizontal screen factor if a helical pattern is selected during said selecting step;

using said horizontal screen factor during said generating step.

32. The method as recited in claim 27 wherein said method further comprises the step of:

engraving either said helical pattern or said cylindrical pattern using the same engraver.

33. The method as recited in claim 27 wherein said method further comprises the step of:

switching between said helical pattern and said cylindrical pattern while the cylinder is being engraved.

34. The method as recited in claim 27 wherein said method is effected using a gravure engraver.

35. A method of helically or cylindrically engraving a cylinder, comprising the steps of:

selecting either said helical pattern or a cylindrical pattern to be engraved;

generating an energizing signal corresponding to said helical pattern or cylindrical pattern whichever was selected during said selecting step; and engraving the selected helical pattern or cylindrical pattern.

36. The method as recited in claim 35 wherein said method further comprises the step of:

driving an engraving head substantially continuously across a surface of the cylinder if said helical pattern was selected during said selecting step;

energizing said engraving head with said energizing signal.

37. The method as recited in claim 35 wherein said method further comprises the step of:

driving an engraving head intermittently across a surface of the cylinder if said cylindrical pattern was selected during said selecting step;

energizing said engraving head with said energizing signal;

causing said engraving head to stop engraving when said engraving head is being driven during said driving step.

38. The method as recited in claim 37 wherein said method further comprises the step of:

monitoring the engraving in order to maintain registration of the cylindrical pattern.

39. The method as recited in claim 35 wherein said method further comprises the steps of:

switching from engraving said helical pattern or cylindrical pattern to engraving said cylindrical pattern or helical pattern, respectively.

40. The method as recited in claim 35 wherein said engraving step includes the step of:

using a single gravure engraver comprising an engraving head having a stylus to engrave the selected helical pattern or cylindrical pattern, which ever was selected during said selecting step.

41. An engraving system comprising:

rotation means for rotating a printing cylinder about a cylindrical axis thereof;

an engraver for engraving ink receiving cavities in the outer surface of said printing cylinder during rotation thereof about said cylindrical axis;

a carriage for supporting said engraver adjacent said printing cylinder;

a stepping motor responsive to stepping pulses for incrementally advancing said carriage in a direction parallel to said cylindrical axis; and a controller comprising:
(a) circumferential drive means for generating bursts of said stepping pulses following complete rotations of said printing cylinder;
(b) helical drive means for generating said stepping pulses at a regular frequency; and
(c) selection means for applying stepping pulses to said stepping motor from a selected one of aforesaid drive means.

42. The engraving system according to claim 41 further comprising means for generating an engraving pause signal during generation of said bursts of stepping pulses and for a predetermined period of time following each said burst.

43. The engraving system according to claim 41 wherein said circumferential drive means comprises reference address means operative at the end of each said pause signal for storing a reference position address, address comparison means for comparing a present position address with said reference position address, and means responsive to said address comparison means for initiating generation of a said burst of stepping pulses.

44. An engraving apparatus comprising:

rotation means for rotating a printing cylinder about a cylindrical axis thereof;

memory means for generating an engraving control signal;

an engraving head responsive to said engraving control signal for engraving ink receiving cavities in the outer surface of said printing cylinder during rotation thereof about said cylindrical axis;

a carriage for supporting said engraving head adjacent said printing cylinder;

a stepping motor responsive to stepping pulses for incrementally advancing said carriage and said engraving head in a direction parallel to said cylindrical axis;

encoder means for generating a series of rotational position pulses in synchronism with rotation of said printing cylinder and a reset pulse following each complete rotation thereof;

a phase locked loop for generating locked-phase helical drive pulses at a frequency equal to the average frequency of said rotational position pulses;

a helical screen register for storing a number H corresponding to a desired horizontal screen factor;
(a) a helical drive counter connected to said phase locked loop and to said helical screen register for generating one of said stepping pulses for each group of H said helical drive pulses;
(b) burst means for generating a burst of said stepping pulses once for each rotation of said printing cylinder, the number of said stepping pulses in each of said bursts being sufficient to advance said engraving head an axial distance equal to a desired width of one column of circumferentially engraved cells;
(c) pause means for interrupting said engraving while said engraving head is being advanced as aforesaid;
(d) line address means responsive to said rotational position pulses and to said reset pulses for generating a line position address indicating the rotational position of said printing cylinder at the completion of each said axial advance of said engraving head, and initiating operation of said burst means when said printing cylinder next returns to said position; and
(e) selection means for applying said stepping pulses to said stepping motor alternatively from either said helical drive counter or said burst means.

45. The engraving apparatus according to claim 44 wherein said burst means comprises an oscillator for generating said stepping pulses at a suitably high frequency, an AND gate enabled by said address means for passing said stepping pulses, and a burst counter for disabling said AND gate after a predetermined number of said stepping pulses have passed therethrough.

46. The engraving apparatus according to claim 44, said pause means comprising a delay counter connected for counting a predetermined number of said rotational position pulses following disabling of said AND gate by said burst counter.

47. A cylindrical engraving system comprising:

rotation means for rotating a printing cylinder about a cylindrical axis thereof;

a stylus;

an engraving head for engraving ink receiving cavities in the outer surface of said printing cylinder by oscillating said stylus into engraving contact therewith during rotation thereof about said cylindrical axis;

a carriage for supporting said engraving head adjacent said printing cylinder;

a stepping motor responsive to stepping pulses for incrementally advancing said carriage in a direction parallel to said cylindrical axis;

circumferential drive means for generating bursts of said stepping pulses following complete rotations of said printing cylinder;

helical drive means for generating said stepping pulses at a regular frequency;

selection means for applying stepping pulses to said stepping motor from a selected one of aforesaid drive means; and pause means activated by said selection means to inhibit oscillation of said stylus by said engraving head during axial advancement of said carriage and thereafter for a predetermined settling time.

* * * * *

UNITED STATES PATENT AND TRADEMARK OFFICE
CERTIFICATE OF CORRECTION

PATENT NO. : 5,555,473
DATED : September 10, 1996
INVENTOR(S) : Seitz et al.

It is certified that error appears in the above-identified patent and that said Letters Patent is hereby corrected as shown below:

On the title page, Section [56], in the second column, line 8, please delete "4,683,500" and insert --4,583,500-- therefor.

On the title page, Section [57], lines 6-7, please delete "controller," and insert --controller.-- therefor.

In column 2, line 27, please delete "with types" and insert --with other types-- therefor.

In column 4, line 29, please delete "with latched" and insert --with a latched-- therefor.

In column 5, line 9, please delete "complex that" and insert --complex than-- therefor.

In column 5, line 58, please delete "that ? hold patterns" and insert --that both patterns-- therefor.

Signed and Sealed this

Second Day of June, 1998

Attest:

BRUCE LEHMAN

*Attesting Officer*  *Commissioner of Patents and Trademarks*